June 8, 1965  R. F. TURNER  3,187,621

FASTENER ASSEMBLY AND PRE-LOAD INDICATING WASHER THEREFOR

Filed Dec. 14, 1962

# United States Patent Office 3,187,621
Patented June 8, 1965

3,187,621
FASTENER ASSEMBLY AND PRE-LOAD
INDICATING WASHER THEREFOR
Rodney Francis Turner, Winster, near Matlock, England, assignor of one-half to Cooper & Turner Limited, Sheffield, England, a company of Great Britain and Northern Ireland
Filed Dec. 14, 1962, Ser. No. 244,814
2 Claims. (Cl. 85—62)

This invention relates to pre-load indicating washers for use with bolts or similar fasteners which enable the optimum tension of said bolt or fastener to be achieved during tightening thereof in a fastener assembly.

According to the invention, there is provided a pre-load indicating washer of hardened and tempered metal having a main, plane portion and a plurality of integral raised portions pressed or otherwise deformed out of the plane of said main portion, at spaced intervals thereof, to such an extent and of a magnitude that yielding or re-deformation of the raised portions back into the plane of the main portion under clamping pressure of an associated bolt or other fastener upon installation in a fastener assembly will determine the load of the clamping pressure required to obtain optimum tension of the bolt or other fastener.

Preferably, the raised portions are in the form of protuberances or bulges which are unbroken with respect to the surface from which they project.

The invention also envisages a fastener assembly comprising a bolt or like fastener having its shank extending through the remote and juxtaposed surfaces of members subject to being clamped together by said fastener, said fastener having surfaces for clamping said members together, a hardened and tempered annular washer around the shank of the fastener interposedly between a transverse clamping surface of said fastener and an adjacent one of the remote surfaces of said members, a plurality of spced apart deformable protuberances in co-planar relation to one another on one face of the washer adapted to be deformed substantially into planar relation with the washer under clamping pressure of the fastener and the height to which said protuberances extend from said one face being such as to determine that the optimum tension of the fastener is obtained when said protuberances are forced backwards into planar relation to the face of the washer under clamping pressure of the fastener.

There is also provided according to this invention a method of manufacturing a pre-load indicating washer which comprises forming a centrally orificed member of plastically deformable metal to constitute a washer, subjecting the washer to the action of dies or other means adapted to displace portions of the metal of the washer out of the plane thereof at spaced intervals to provide indents or notches in one face and complementary bulges or protuberances of a predetermined magnitude at spaced intervals in the other face of the washer and heat treating the washer so as to harden and temper the metal of the washer and determine the compressive force or loading required to re-displace the bulges or protuberances substantially back into the plane of the washer.

A typical embodiment of the invention is illustrated in the accompanying drawings, in which.

Figure 1:
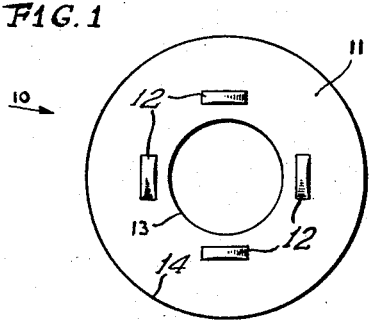
FIG. 1 is an elevation view looking on the obverse side of one form of pre-load indicating washer acording to the invention.
Figure 3:
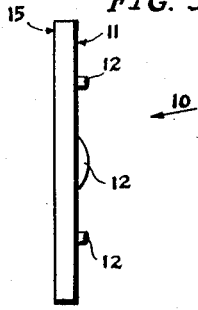
FIG. 3 is a side elevation of FIG. 1.
Figure 2:
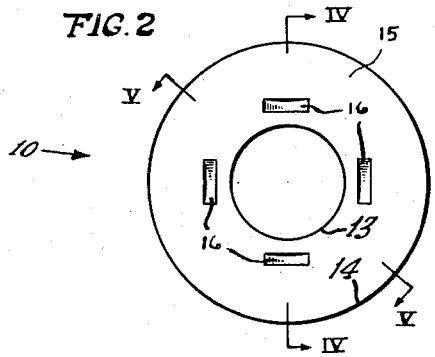
FIG. 2 is also an elevation view but looking on the reverse side of the washer.
Figure 4:
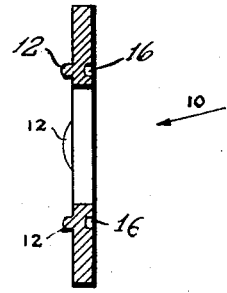
FIG. 4 is a cross section on the line IV—IV of FIG. 2.
Figure 5:
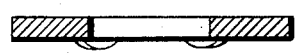
FIG. 5 is a cross section on the line V—V of FIG. 2.

As shown in the embodiment illustrated in FIGS. 1 to 5, the pre-load indicating annular metal washer 10 consists of an annular body portion and is provided on one face 11 thereof with a plurality of bulges 12 at regular intervals therein between the inner and outer peripheries 13 and 14 of the washer, said bulges being substantially oblong in outline each with its greater length extending in the direction of a line tangential to a circle around the inner periphery 13 of the washer and having convex surfaces extending arcuately in the direction of their greater length and said bulges having been formed by displacement of metal out of the plane of the washer at said one face 11 thereof as a result of suitably indenting the other face 15 of the washer to form oblong notches 16 at intervals in said other face 15, which notches have concave basal surfaces substantially complementary to the convex surfaces of the bulges 12.

The washer is composed of steel and has been treated for the purpose of hardening and tempering it, such heat treatment, however, not having been carried out until after formation of the bulges 12 thereon.

Figure 6:
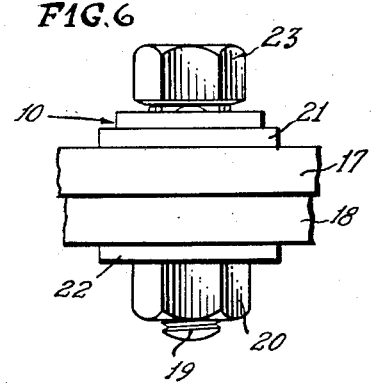
FIG. 6 is a schematic view in elevation showing the washer in use with a fastener assembly employing a bolt as the fastener thereof and shown in position prior to tightening of the bolt.
Figure 7:
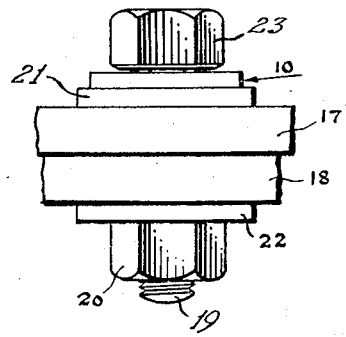
FIG. 7 is a similar view to FIG. 6 after tightening of the bolt.

Use of the washer is illustrated in FIGS. 6 and 7 where, as will be seen, a fastener assembly comprises two members 17, 18, adapted to be clamped together by a bolt 19 and nut 20 and standard washers 21, 22.

In addition to these standard washers, the pre-load indicating washer 10 depicted in FIGS. 1 to 5 is disposed around the shank of the bolt 19 interposedly between the clamping face of the bolt head 23 and the standard washer 21, said pre-load indicating washer 10 being disposed with its bulges 12 in abutment with said clamping face of said bolt head 23 so that a small gap obtains between the bolt head and the adjacent face of the washer 10, said gap being of the order of 0.075 inch determined by the height of the bulges. When the nut 20 is tightened, the bulges are forced back into or towards the face 11 of the washer from which they project thereby permitting the gap between the clamping face of the bolt head 23 and the face 11 of the washer 10 to be closed until it is of the order of 0.015 inch. At this closure of the gap the tension in the bolt 19 will be 21.09 to 24.25 tons assuming, for example, that the diameter of the bolt is one inch and the thickness of the washer 0.160 inch.

If desired, use of the standard washer 21 may be dispensed with.

The pre-load indicating washer of the present invention provides a simple and accurate means of arriving at the correct tension of a bolt when tightening high strength friction grip bolts using an ordinary hand wrench or power impact wrench. It not only indicates when the correct tension has been reached far more accurately than by using either torque control method or the part-turn method and avoids the necessity of marking nuts and bolts after preliminary tightening and again checking after final tightening, but also leaves a definite visual indication of tension and enables inspection to be undertaken at any convenient time after the bolts or fasteners have been tightened.

In practice, a graded range of pre-load indicating washers can be manufactured which require different loadings to produce the requisite yielding of the bulges back into the surface of the washer.

What I claim is:

1. A pre-load indicating washer for visually indicating the magnitude of compressive force applied by a fastener to opposed faces thereof, comprising an annular body portion, a plurality of protuberances struck from said body portion at circumferentially spaced intervals and integrally formed with the material of said body portion, said protuberances being spaced from the inner and outer peripheries of said annular body, said protuberances being oblong in outline and defined by axially extending sides, said axially extending sides being substantially tangential to circles concentric with the peripheries of said washer, each of said protuberances having a concave basal surface lying within the axial confines of said annular body portion and being substantially complementary to the convex surfaces which extend out of the plane of said body portion, the number and size of said protuberances being dimensioned with respect to the compressive force applied by said fastener so that said raised portions will plastically deform into the body portion of said washer when the compressive force applied to said washer by said fastener reaches a predetermined magnitude.

2. A fastener assembly including a bolt having its shank extending through the remote and juxtaposed surfaces of members clamped together by said fastener assembly, and a pre-load indicating washer disposed around the shank of the bolt interposedly between a transverse clamping surface of said fastener and an adjacent one of the remote surfaces of said members, said washer having an annular body portion, a plurality of protuberances struck from said body portion at circumferentially spaced intervals and integrally formed with the material of said body portion, said protuberances being spaced from the inner and outer peripheries of said annular body, said protuberances being oblong in outline and defined by axially extending sides, said axially extending sides being substantially tangential to circles concentric with the peripheries of said washer, each of said protuberances having a concave basal surface lying within the axial confines of said annular body portion and being substantially complementary to the convex surfaces which extend out of the plane of said body portion, the number and size of said protuberances being dimensioned with respect to the compressive force applied by said fastener so that said raised portions will plastically deform into the body portion of said washer when the compressive force applied to said washer by said fastener reaches a predetermined magnitude.

References Cited by the Examiner
UNITED STATES PATENTS

| | | | |
|---|---|---|---|
| 506,923 | 10/93 | Miles. | |
| 1,043,721 | 11/12 | Prince | 151—34 |
| 1,774,695 | 9/30 | Baynes | 85—50 |
| 2,369,865 | 2/45 | Spencer | 85—62 |
| 2,464,152 | 3/49 | Ralston | 85—62 |
| 2,908,310 | 10/59 | Grey. | |
| 2,943,528 | 7/60 | Curry | 85—62 |

EDWARD C. ALLEN, *Primary Examiner.*